Jan. 16, 1962  J. E. POUNDERS  3,016,674
MOBILE SUPPORT FOR AN ELECTRIC HEDGE TRIMMER
Filed Nov. 30, 1959
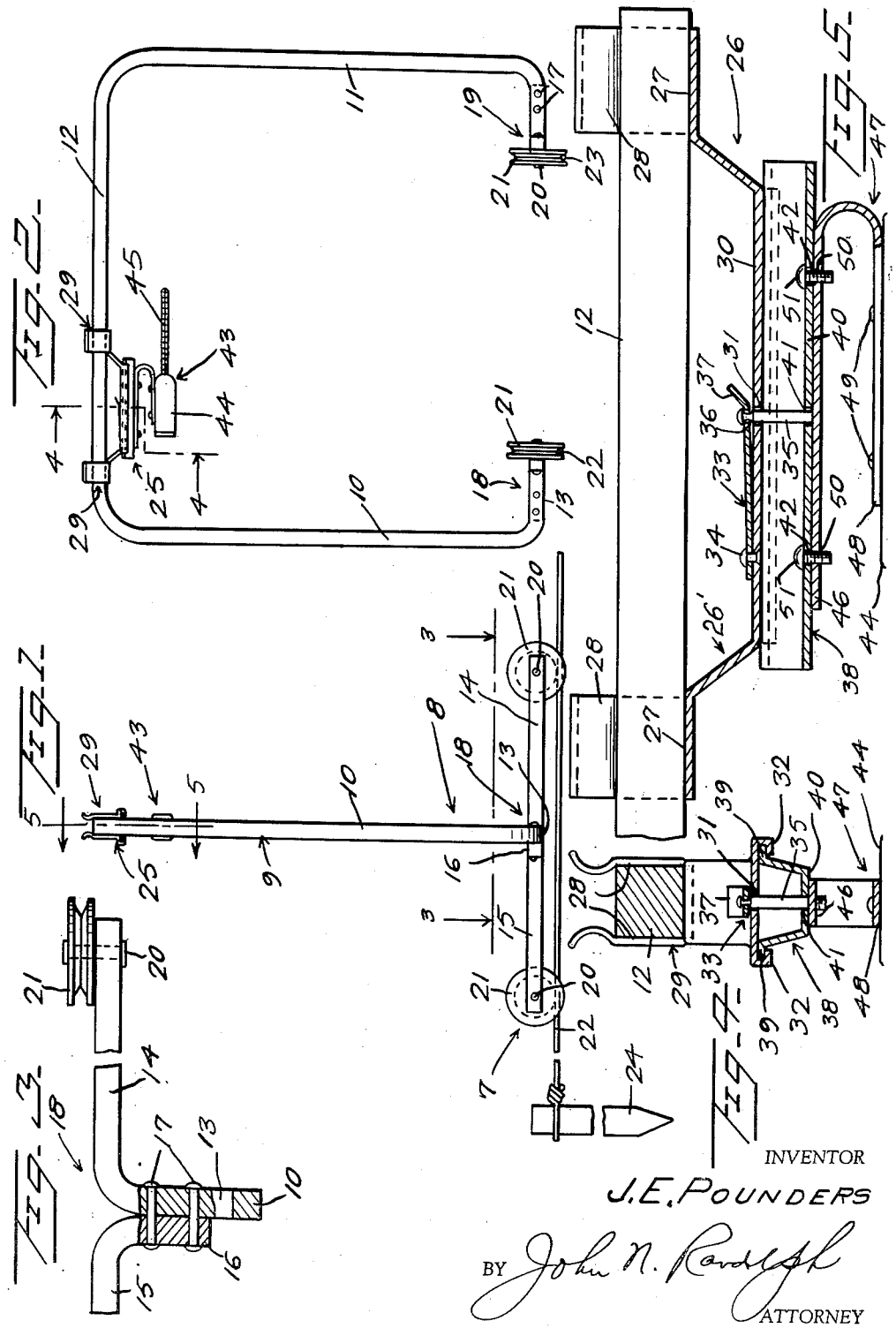
INVENTOR
J.E. POUNDERS
BY John N. Randolph
ATTORNEY

3,016,674
MOBILE SUPPORT FOR AN ELECTRIC HEDGE TRIMMER
Jimmie E. Pounders, Pinellas Park, Fla.
(8727 Eyra Place, St. Johns 14, Mo.)
Filed Nov. 30, 1959, Ser. No. 856,267
2 Claims. (Cl. 56—236)

This invention relates to a novel mobile support or carriage for adjustablly mounting a conventional electric hedge trimmer and by means of which the hedge trimmer can be propelled along a hedge for accurately trimming the hedge.

Another object of the invention is to provide a mobile support for an electric hedge trimmer including rail members, capable of being quickly and easily erected at desired elevations along opposite sides of a hedge, on which the carriage is supported for movement in a horizontal plane unaffected by irregularities in the surface of the ground around the hedge.

A further object of the invention is to provide a mobile support having means for quickly and easily detachably and adjustably mounting a conventional hedge trimmer on the carriage of the support for supporting the hedge trimmer in selected positions relative to the carriage for accurately trimming selected parts of a hedge.

Various other objects and advantages of the invention will hereinafter become more fully apparent from the following description of the drawing, illustrating a presently preferred embodiment thereof, and wherein:

FIGURE 1 is a fragmentary side elevational view of the mobile support with a conventional electric hedge trimmer, shown diagrammatically, applied thereto;

FIGURE 2 is a front elevational view thereof, looking from right to left of FIGURE 1;

FIGURE 3 is an enlarged fragmentary horizontal sectional view of a portion of the carriage, taken substantially along a plane as indicated by the line 3—3 of FIGURE 1;

FIGURE 4 is an enlarged fragmentary vertical sectional view, taken substantially along the line 4—4 of FIGURE 2; and FIGURE 5 is an enlarged fragmentary vertical sectional view, taken substantially along the line 5—5 of FIGURE 1.

Referring more specifically to the drawing, the mobile support in its entirety and comprising the invention is designated generally 7 and includes a carriage, designated generally 8.

The carriage 8 includes an arch shaped frame portion 9 having spaced substantially parallel upright sides 10 and 11 and a straight top portion 12 which is disposed at approximately right angles to the upright sides 10 and 11. The ends of the top portion 12 merge integrally with the upper ends of the sides 10 and 11, as best seen in FIGURE 2. The sides 10 and 11 have corresponding inturned extensions 13 at their lower ends which are disposed in spaced apart aligned relation to one another and each of which terminates in an arm 14. The arms 14 extend in the same directions from the inner ends of the portions 13 and are disposed approximately at right angles thereto and crosswise of the plane of the arch portion 9. Said arms 14 are also disposed at approximately a right angle to the arch portion 9 whereby if said arch portion is in an upright position the arms 14 are in substantially horizontal positions. The parts 10 to 14, inclusive, are preferably formed from a single rigid bar of noncircular cross section, as seen in FIGURES 3 and 4, and the arms 14 thereof constitute the ends of said bar. The frame of the carriage 8 also includes two corresponding arms 15 which extend from the inturned extensions 13, in the opposite direction from the arms 14, and which arms 15 are disposed in alignment with the arms 14. The arms 15 have angularly turned inner ends 16 which are disposed against the extensions 13 and rigidly secured thereto by fastenings 17. The aligned arms 14 and 15 which extend from the extension 13 of the side 10 form a horizontal bottom frame portion 18 and the other aligned arms 14 and 15 form a second bottom frame portion 19. Said frame portions 18 and 19 are disposed in spaced apart substantially parallel relation to one another, as seen in FIGURE 2.

Axles 20 extend transversely through the arms 14 and 15, remote from the frame portions 13, and grooved wheels 21 are journaled on said axles 20 and are preferably located between the bottom frame portions 18 and 19. Thus, each bottom portion 18 and 19 is provided with two wheels 21, which wheels are disposed in alignment with one another and journaled for rotation on parallel axles. Said wheels 21 constitute a part of the carriage 8, and the arch shaped frame portion 9 extends upwardly from the bottom frame portions 18 and 19 between the wheels 21 of each bottom frame portion.

The carriage 8 is demountably supported for movement on two parallel strands of wire 22 and 23. A stake 24 is secured to each end of each strand 22 and 23. The stakes 24 are adapted to be driven into the ground so that the wire strands 22 and 23 will each be stretched taut between its two anchoring stakes 24. The strands 22 and 23 are of a sufficiently heavy gauge and are of such a length that said strands will not sag between their anchoring stakes 24 due to supporting the weight of the carriage 8. The stakes 24 can be driven into the earth to a desired extent for supporting the strands 22 and 23 at a desired elevation. Ordinarily, it is sufficient if the wires 22 and 23 clear any high spots in the ground between the anchoring stakes. The wires 22 and 23 are positioned parallel to one another and so as to straddle a hedge, not shown, over and around which the arch portion 9 of the frame is disposed, when the carriage 8 is supported by engagement of the wheels 21 with the wires 22 and 23. It will be understood that the wheels of the bottom portion 18 will engage one of the wires, as for example, the wire 22, as illustrated, and the wheels 21 of the bottom frame portion 19 will then engage the other wire 23 so that movement of the carriage 8 will be parallel to the wires 22 and 23.

The mobile support 7 also includes a mounting bracket 25 including an upper section 26 which is detachably and adjustably supported on either the top portion 12 or one of the side portions 10 or 11. Said upper section 26, as best seen in FIGURES 4 and 5, includes an elongated bar 26′ having upwardly offset end portions 27 each of which has a pair of upstanding spring jaws 28 combining therewith to form a spring clamp 29. The two spring clamps 29, constituting the ends of the upper section 26, are disposed in alignment with one another and are adapted to detachably and resiliently embrace the top frame portion 12 for detachably mounting the upper bracket section 26 thereon. The bar 26′ of the upper bracket section 26 has an intermediate portion 30 which is downwardly offset relative to said end portions 27 and which is provided intermediate of its ends with an opening 31. Said intermediate bar portion 30 has downwardly and inwardly turned back side edges forming guide channels 32 which open toward one another, as seen in FIGURE 4. One end of a leaf spring 33 is secured to the upper side of the bar portion 30 by a fastening 34. A latching pin 35 extends loosely through the opening 31 and has an upper end secured in an opening 36 of the leaf spring 33, adjacent an upturned free end 37 of said leaf spring.

The mounting bracket 25 includes a lower section comprising an elongated attaching member 38 having coplanar side edge portions 39 extending from end-to-end thereof and which fit slidably and detachably in the channels 32. Said attaching member 38 includes an intermediate portion 40 which likewise extends from end-to-end thereof and which is preferably downwardly offset relative to the side edge portions 39 and which is provided with an intermediate opening 41 and openings 42 which are longitudinally spaced from the opening 41.

A conventional electric hedge trimmer 43 is adapted to be supported by the mounting bracket 25 and includes a motor casing 44 from one end of which projects a reciprocating cutter bar 45, as illustrated diagrammatically in FIGURE 2. The hedge trimmer 43 has an elongated handle 46 which forms an outer leg of a bar 47. The bar 47 is turned back upon itself intermediate of its ends to provide an inner leg 48 which is disposed against a part of the motor casing 44 and which may be secured thereto in any conventional manner, as by means of fastenings 49, to position the handle 46 in outwardly offset relation to the motor casing 44 and longitudinally thereof. Longitudinally spaced threaded openings 50 are formed in the handle 46 to align with the openings 42 for receiving headed screw fastenings 51 which extend loosely through the openings 42 and which threadedly engage the openings 50 for securing the handle 46 against the underside of the portion 40, as clearly illustrated in FIGURE 5. The hedge trimmer 43 is thus supported longitudinally of the mounting bracket 25 and longitudinally of the frame portion 12, by which the mounting bracket is supported, as seen in FIGURE 2.

The lower section 38 can be inserted endwise into the guide channels 32 from either end of the bar portion 30 and the latch pin 35 can be retracted by engaging and displacing the free end 37 of the leaf spring away from the bar portion 30 until said latch pin has cleared an end of the intermediate portion 40 and the head of the fastening 51, located adjacent thereto. The spring 33 can then be released to allow the latch pin to slide along the inner side of the portion 40 until the opening 41 thereof moves into alignment with the opening 31, whereupon the latch pin 35 is projected into the opening 41 by the leaf spring 33, for latching the lower section 38 to the upper section 26 and with the cutter bar 45 extending beyond either end of the bracket 25.

Assuming that the carriage 8 is supported on the wires 22 and 23 and with the arched frame portion 9 straddling a hedge, the hedge trimmer 43, supported as shown in FIGURE 2, will trim the top of the hedge as the carriage 8 is propelled from left to right, as seen in FIGURE 1. It will be understood that the hedge trimmer 43 can be connected to any suitable source of electric current, not shown. After the carriage 8 has moved from end-to-end of the wires 22 and 23 with the hedge trimmer 43 operating, the upper section 26 of the mounting bracket can be adjusted to another position on the top frame portion 12. The lower section 38 can be removed and reversed, from its position as illustrated relative to the bar portion 30, for offsetting the cutter bar 45 in the opposite direction or toward the frame side 10 with the cutter bar facing in the opposite direction for cutting another part of the top of the hedge as the carriage 8 is manually propelled in the opposite direction or from right to left of FIGURE 1. In the aforedescribed manner the entire top of the hedge can be cut, after which the mounting bracket 25 can be detached from a top frame part 12 and applied to one and then the other of the frame sides 10 and 11 for supporting the hedge trimmer 43 in different positions for accurately trimming the sides of the hedge as the carriage 8 is manually propelled back and forth along the wires 22 and 23.

It will thus be readily apparent that a mobile support of extremely simple construction has been provided and which is capable of being efficiently utilized with a conventional electric hedge trimmer to enable a hedge to be trimmed accurately and rapidly with a minimum of manual effort. It will be understood that the stakes 24 will have to be removed from the ground from time to time and repositioned for supporting the carriage 8 in positions so that the hedge trimmer 43 may trim different sections of long hedges.

Various modifications and changes are contemplated and may be resorted to without departing from the function or scope of the invention as hereinafter defined by the appended claims.

I claim as my invention:

1. A mobile support for an electric hedge trimmer comprising a carriage including two bottom portions disposed in spaced apart substantially parallel relation to one another, two wheels journaled on each of said bottom portions in spaced apart aligned relation to one another, an arch shaped frame connecting said bottom portions and disposed in an upright position crosswise of the carriage and of said bottom portions and between and spaced from the wheels of each bottom portion, and a mounting bracket including an elongated first section having longitudinally spaced spring clamps detachably connected to longitudinally spaced aligned parts of said arch shaped frame and a second section connected to and disposed longitudinally of the first section between the spring clamps and adapted to be secured to and disposed longitudinally of an electric hedge trimmer, said mounting bracket being disposed within the arch shaped frame for supporting the electric hedge trimmer within said arch shaped frame and substantially coplanar therewith.

2. A mobile support as in claim 1, said mounting bracket including means detachably and reversibly connecting said second section to the first section for adjustably positioning the electric hedge trimmer relative to the mounting bracket for cutting in either direction of movement of the carriage and in different positions longitudinally offset relative to the ends of the mounting bracket.

References Cited in the file of this patent

UNITED STATES PATENTS

| 277,304 | Maeder | May 8, 1883 |
| 1,627,258 | Sullivan | May 3, 1927 |
| 2,762,186 | Janata | Sept. 11, 1956 |
| 2,798,354 | O'Brien et al. | July 9, 1957 |

FOREIGN PATENTS

| 698,437 | Great Britain | Oct. 14, 1953 |